United States Patent [19]

Rollmann et al.

[11] Patent Number: 5,654,249

[45] Date of Patent: Aug. 5, 1997

[54] CHROMIUM CATALYST COMPOSITIONS AND POLYMERIZATION PROCESSES THEREWITH

[75] Inventors: Kent W. Rollmann, Searcy, Ark.; Elizabeth A. Benham, Bartlesville, Okla.; William M. Whitte, Bartlesville, Okla.; Max P. McDaniel, Bartlesville, Okla.; William R. Coutant, Bartlesville, Okla.; F. Wallace Bailey, Bartlesville, Okla.

[73] Assignee: Phillips Petroleum Company, Bartlesville, Okla.

[21] Appl. No.: 450,184

[22] Filed: May 25, 1995

Related U.S. Application Data

[62] Division of Ser. No. 134,765, Oct. 8, 1993, Pat. No. 5,508,362.

[51] Int. Cl.$^6$ ........................................ C08F 4/24
[52] U.S. Cl. ............... 502/117; 502/113; 502/120; 502/242; 502/256; 502/319; 526/105; 526/106; 526/118
[58] Field of Search ............... 502/113, 117, 502/120, 242, 256, 319; 526/118, 105, 106

[56] References Cited

U.S. PATENT DOCUMENTS

| 3,947,433 | 3/1976 | Witt | 260/88.2 R |
|---|---|---|---|
| 4,981,927 | 1/1991 | Rekers et al. | 526/105 |
| 5,198,400 | 3/1993 | Katzen et al. | 502/113 |

*Primary Examiner*—David W. Wu
*Attorney, Agent, or Firm*—Carl D. Corvin

[57] ABSTRACT

Chromium catalyst compositions are provided. These chromium catalyst compositions comprise at least two chromium catalyst systems that have a certain amount of chromium and a support that comprises silica and titania. the supports have certain pore volumes and surface areas. These catalyst compositions are useful for homopolymerizing ethylene or copolymerizing ethylene with a comonomer. The resins produced are useful in film applications.

10 Claims, No Drawings

CHROMIUM CATALYST COMPOSITIONS AND POLYMERIZATION PROCESSES THEREWITH

This application is a division application of application Ser. No. 08/134,765, which was filed on Oct. 8, 1993, and which issued as U.S. Pat. No. 5,508,362 on Apr. 16, 1996.

This invention is related to the field of chromium catalyst compositions. This invention is also related to the fields of polymerizing ethylene, or copolymerizing ethylene and a comonomer, with a chromium catalyst composition.

The high molecular weight-high density ethylene polymer film market, in the U.S., is dominated by multicomponent ethylene polymers (colloquially referred to as "bimodal" or "multimodal" polymers) that are produced by mixtures of titanium halide catalysts. These multicomponent ethylene polymers offer good impact resistance and thus, good down gauging capability, along with a high modulus. The advent of these multicomponent ethylene polymers has opened up markets previously covered by other materials such as paper, thicker gauge ethylene polymers, and lower density ethylene polymers. However, these multicomponent ethylene polymers are produced commercially using cascade reactor systems in which two reactors are linked in series so that a two stage polymerization can take place with different polymerization conditions in each reactor. This is a more expensive production method than a single stage reactor system.

SUMMARY OF THE INVENTION

In order to compete with these multicomponent ethylene polymers it is important for a resin to have good impact strength, tear resistance in the transverse direction, appearance, and processing behavior. To date, chromium catalysts have not been competitive in the high molecular weight-high density ethylene polymer film market. For example, one chromium catalyst may produce a resin that has good film properties, but poor bubble stability at high production rates and thin gauges. On the other hand, another chromium catalyst may produce a resin that has a good bubble stability at high production rates and thin gauges, but poor film properties. However, making a chromium catalyst that produces an high molecular weight-high density ethylene polymer film resin that has good film properties and good bubble stability at high production rates and thin gauges has, until this invention, not been accomplished.

It is an object of this invention to provide chromium catalyst compositions.

It is another object of this invention to provide chromium catalyst compositions that are useful for polymerizing ethylene or copolymerizing ethylene with a comonomer.

It is yet another object of this invention to provide chromium catalyst compositions that are useful for polymerizing ethylene or copolymerizing ethylene with a comonomer, thereby producing a high molecular weight-high density ethylene polymer that is useful for making a film that has good film properties and that can be processed at high production rates and thin gauges.

In accordance with one embodiment of this invention a chromius catalyst composition is provided. This chromium catalyst composition comprises at least two chromium catalyst systems:

(a) One of these chromium catalyst systems comprises chromium and a support. The amount of chromium in this catalyst system is from about 0.5 to about 1 weight percent based on the total weight of said catalyst system. The support comprises silica and titania. The support has a pore volume from about 2 to about 3 cubic centimeters per gram and a surface area from about 400 to about 600 square meters per gram.

(b) Another one of these chromium catalyst systems also comprises chromium and a support. The amount of chromium in this catalyst system is from about 1 to about 1.5 weight percent based on the total weight of said catalyst system. The support also comprises silica and titania. The support has a pore volume from about 0.7 to about 1.4 cubic centimeters per gram, and a surface area from about 300 to about 400 square meters per gram.

In accordance with another embodiment of this invention the above embodiment of the invention can be contacted with ethylene or with ethylene and another comonomer, under polymerization conditions, to produce a homopolymer or a copolymer.

The invention as disclosed in this application can be suitably practiced in the absence of any steps, components, compounds, or ingredients not disclosed herein.

DETAILED DESCRIPTION OF THE INVENTION

In general, the chromium catalyst compositions used in this invention comprise at least two chromium catalyst systems. These chromium catalyst systems comprise a chromium component and a support component. The support component comprises silica and titania. The term "support" is not meant to be construed as an inert component.

The Chromium Catalyst System that has a High Pore Volume Support

The amount of chromium in this chromium catalyst system is from about 0.5 weight percent to about 1 weight percent based on the total weight of the catalyst system (hereafter "Catalyst System XX"). If substantially less than 0.5 weight percent of chromium is used, the catalyst system will have an undesirably low activity. If substantially more than 1 weight percent is used, the catalyst system will produce a resin that will have an undesirable amount of long chain branching. A resin with an undesirable amount of long chain branching would be less desirable for film applications because of lower film properties such as tear resistance in the transverse direction. Additionally, having a substantially higher amount of chromium in the catalyst system could impart an undesired color to the resin.

The support comprises silica and titania. The amount of titania is from about 2 weight percent to about 10 weight percent based on the total weight of the support. If substantially less than 2 weight percent of titanium is used, the molecular weight distribution of a resulting resin will be too narrow. If substantially more than 10 weight percent is used, the catalyst system will have an undesirably low activity. The amount of silica is from about 80 to about 98 weight percent based on the total weight of the support. Other components can be present in the support, provided that, they do not adversely affect the properties of the support or adversely affect the properties of the resins produced.

The support should have a pore volume from about 2 cubic centimeters per gram to about 3 centimeters per gram. If the pore volume is substantially less than 2 cubic centimeters per gram, the melt index of a resulting resin will be undesirably low. If the pore volume is substantially more than 3 cubic centimeters per gram the catalyst system will be to soft to handle.

The support should have a surface area from about 400 square meters per gram to about 600 square meters per gram.

If the surface area is substantially less than about 400 square meters per gram, the catalyst will have an undesirably low polymerization activity and the amount of long chain branching in a resulting resin will be undesirably increased. If the surface area is more than 600 square meters per gram, the catalyst will substantially lose its melt index potential and the catalyst will have an undesirably low polymerization activity.

These catalyst systems can be produced in accordance with the procedures disclosed in U.S. Pat. Nos. 3,887,494; 3,900,457; and 4,119,569; the disclosures of which are hereby incorporated by reference.

The Chromium Catalyst System that has a Low Pore Volume Support

The amount of chromium in this catalyst system is from about 1 weight percent to about 1.5 weight percent based on the total weight of the catalyst system (hereafter "Catalyst YY"). If substantially less than 1 weight percent of chromium is used, the amount of long chain branching desired in the resulting resin will not be achieved and when the resin is blown into a film, the bubble will be less stable. If substantially more than 1.5 weight percent is used, I the resulting resin could have an undesirable color imparted to it.

The support comprises silica and titania. The amount of titania is from about 2 weight percent to about 10 weight percent based on the total weight of the support. If substantially less than 2 weight percent of titanium is used, the molecular weight distribution of a resulting resin will be too narrow. If substantially more than 10 weight percent is used, the catalyst system will have an undesirably low activity. The amount of silica is from about 80 to about 98 weight percent based on the total weight of the support. Other components can be present in the support, provided that, they do not adversely affect the properties of the support or adversely affect the properties of the resins produced.

The support should have a pore volume from about 0.7 cubic centimeters per gram to about 1.4 centimeters per gram. If the pore volume is substantially less than 0.7 cubic centimeters per gram, the catalyst system will have an undesirably low activity. If the pore volume is substantially more than 1.4 cubic centimeters per gram the bulk density of the catalyst will decrease undesirably and the amount of long chain branching in the resulting resin will decrease undesirably. It is preferable if the pore volume is from about 0.8 to about 1.2 cubic centimeters per gram for best control of long chain branching and film properties.

The support should have a surface area from about 300 square meters per gram to about 400 square meters per gram. If the surface area is substantially less than about 300 square meters per gram, the catalyst will have an undesirably low activity. If the surface area is more than 400 square meters per gram, the resulting resin will have an undesirably low film processability.

These catalyst systems can be produced in accordance with the procedures disclosed in U.S. Pat. No. 4,981,831 the disclosure of which is hereby incorporated by reference.

It is preferred if the amount of titania in each support is substantially the same. If the amount of titania is not substantially the same, the molecular weight distributions of each of the resulting polymers will be undesirably different.

The surface area and pore volume of the supports can be determined by nitrogen sorption by a person with ordinary skill in the art. For example, the following references can be used "Adsorption, Surface Area and Porosity" by S. J. Gregg and K. S. W. Sing, Academic Press, London (1982); and "Introduction to Powder Surface Area" by S. Lowell, J. Wiley & Sons, New York, N.Y. (1979); the disclosures of which are hereby incorporated by reference. Additionally, a "Quantachrome Autosorb-6 Nitrogen Pore Size Distribution Instrument" can be used to help determine surface areas and pore volumes of the supports. This instrument (or similar instrument) is available from the Quantachrome Corporation, Sysset, N.Y.

Once the chromium catalyst systems are made they can be combined in any manner known in the art. For example, they can be dry blended together in a mixer or added to a feed stream that leads to a reactor. The weight ratio of Catalyst XX to Catalyst YY can vary from 99:1 to 1:99 depending on the properties desired in the resin. In general, using more of Catalyst XX produces a resin that has better film properties, whereas, using more of Catalyst YY produces a resin that has a better bubble stability during film production. It is preferred if the weight ratio of Catalyst XX to Catalyst YY is from about 6:1 to about 1:1; more preferably it is about 5:1 to about 2:1 in order to promote the production of resins with good film properties and good film processability.

It should be noted that after the catalyst systems are combined they can be activated together at the same temperature. They can also be separately activated and then combined. However, if they are separately activated the temperature at which each activation takes place should not be substantially different, otherwise, the molecular weight distributions of each of the resulting polymers will be undesirably different.

The chromium catalyst compositions used in this invention can be used to homopolymerize ethylene or to copolymerize ethylene with another comonomer. Suitable comonomers are those olefins having from 3 to about 20 carbon atoms. It is preferable if these olefins are 1-olefins. Suitable examples of these olefins include propylene, 1-butane, 3-methyl-1-butane, 1-pentene, 3-methyl-1-pentene, 4-methyl-1-pentene, 1-hexene, 3-ethyl-1-hexene, 1-octane, 1-decene, and mixtures thereof.

Various polymerization schemes are known in the art. For example, U.S. Pat. Nos. 2,825,721; 3,152,872; 3,172,737; 3,203,766; 3,225,023; 3,226,205; 3,242,150; 3,248,179; and 4,121,029 (the disclosures of which are hereby incorporated by reference) disclose several polymerization schemes. A particularly preferred polymerization scheme is the slurry or particle form polymerization method. This method is disclosed, for example, in U.S. Pat. No. 3,248,179.

The substantially monomodal, high molecular weight-high density ethylene polymer resins produced using the chromium catalyst compositions disclosed herein can be made into films that have competitive film properties and good processability. These resins will have a high load melt index from about 1 to about 20 (preferably about 5 to about 15) grams per ten minutes, when measured in accordance with ASTM D-1238 65T. Additionally, these resins will have a density from about 0.94 to about 0.97 (preferably about 0.945 to about 0.955) grams per cubic centimeter, when measured in accordance with ASTM D-1505-85.

EXAMPLE

This example is provided to further assist a person skilled in the art with understanding this invention. This example is intended to be illustrative of the invention and is not meant to be construed as limiting the scope of the invention.

Part One

The following chromium catalyst composition was used to copolymerize ethylene and 1-hexene:

(1) A chromium catalyst system that had a high pore volume silica-titania (2.5 weight percent titania) support was purchased from the W. R. Grace Corporation. It had a surface area of about 550 square meters per gram and a pore volume of about 2.5 cubic centimeters per gram. It also had a chromium content of about 1 weight percent based on the weight of the chromium catalyst system; and (2) A chromium catalyst system that had a low pore volume silica-titania (2.3 weight percent titania) support was purchased from the W. R. Grace Corporation. It had a surface area of about 360 square meters per gram and a pore volume of about 1.1 cubic centimeters per gram. It also had a chromium content of about 1.1 weight percent based on the weight of the chromium catalyst system.

These two catalyst systems were then mixed together and activated by subjecting them to air at 650 degrees Celsius.

The copolymerization was conducted in an 87 liter, 15.2 centimeter pipe loop reactor. The copolymer was recovered in a flash chamber and a Vulcan dryer was used to dry the copolymer.

Ethylene that had been dried over alumina was used as the polymerization monomer. 1-hexene that had been dried over alumina was used as the comonomer. Isobutane that had been degassed by fractionation and dried over alumina was used as the diluent. The copolymerization was conducted at about 100 degrees Celsius and lasted for about one hour.

The ethylene-1-hexene copolymer produced was then evaluated as a film resin. The film blowing conditions were as follows:

1. a die gap of 0.035 inches;
2. a four to one blow up ratio;
3. a fourteen inch frost line height;
4. a screw speed of 75 revolutions per minute; and
5. an extruder temperature of 220 degrees Celsius.

The resin was blown into a one mil film (except when it was down gauged) and compared to other film resins. The results are presented below.

TABLE 1

| Material | A[1] | B[2] | C[3] | S1[4] | S2[5] |
| --- | --- | --- | --- | --- | --- |
| HLMI (dg/min)[6] | 7.5 | 6.4 | 8.9 | 8.7 | 8.8 |
| MI (dg/min)[8] | 0.07 | 0.04 | 0.08 | — | — |
| HLMI/MI | 108 | 145 | 111 | — | — |
| Density (gms/cc)[8] | 0.9531 | 0.9509 | 0.949 | 0.953 | 0.951 |
| Screw RPM | 75 | 75 | 75 | 75 | 75 |
| Melt temp. (°C.) | 242 | 241 | 234 | 242 | 240 |
| Rate (lb/hr) | 38.9 | 38.9 | 40.5 | 34.2 | 35.1 |
| Extruder (kW) | 5.1 | 5.1 | 4.9 | 4.5 | 4.5 |
| Die pressure (psi) | 2950 | 3100 | 2700 | 3400 | 3400 |
| Line speed (ft/min) | 64 | 64 | 67 | 57 | 57 |
| Gauge (mils) | 1 | 1 | 1 | 1 | 1 |
| Maximum line speed* (ft/min) | — | — | 124s | 103s | 100s |
| Gauge @ max. speed (mils) | — | — | 0.5 | 0.5 | 0.5 |
| Breathing[9] | 1 | 1 | 1 | 1 | 1 |
| Dancing[10] | 2 | 2 | 1 | 2 | 2 |
| Streaks[11] | 2 | 2 | 2 | 1 | 2 |
| Surging[12] | 1 | 1 | 1 | 1 | 1 |
| Bubble symmetry[13] | 1 | 1 | 1 | 1 | 2 |
| Gel uniformity[14] | 3 | 2 | 1 | 2 | 2 |
| TOTAL[15] | 10 | 9 | 7 | 8 | 10 |

*s indicates a stable bubble at the maximum line speed shown.
Table Notes:
[1]This is a film produced from a resin that was made by copolymerizing ethylene and 1-hexene with only Catalyst XX.
[2]This is a film produced from a resin that was made by copolymerizing ethylene and 1-hexene with only Catalyst YY.
[3]This is the inventive film produced from the inventive resin that was made from the inventive catalyst composition.

TABLE 1-continued

| Material | A[1] | B[2] | C[3] | S1[4] | S2[5] |
| --- | --- | --- | --- | --- | --- |

[4]This is an industry standard film resin.
[5]This is another industry standard film resin.
[6]This is the High Load Melt Index measured in accordance with ASTM D-1238 65T.
[7]This is the Melt Index measured in accordance with ASTM D-1238 65T.
[8]This is the Density measured in accordance with ASTM D-1505-85.
Items 9–15 are qualitative observations of the bubble during film production. The range in results is from 1 to 4. A "1" means that the defect is not detectable or barely visible. A "2" means that the defect is visible but it is not serious. A "3" means that the defect is not acceptable but the resin could be processed. A "4" means that the defect is so bad that it would shut down the line.
[9]This is a qualitative measure of the vertical instability in the frost line position.
[10]This is a qualitative measure of the horizontal instability in the bubble.
[11]This is a qualitative measure of the streaks present in the film, especially along port lines.
[12]This is a qualitative measure of the stability of the resin through the extruder.
[13]This is a qualitative measure of the symmetry of the bubble in three dimensions.
[14]This is a qualitative measure of the imperfections in the film such as, chars, gels, applesauce, or other non-uniform appearance.
[15]This is the total of the qualitative measures.

As can been seen from table one, inventive resin C processed extremely well. The bubble was stable at high line speeds as well. Furthermore, when the film was downgauged to a 0.5 mil thickness the line speed was 124 ft/min. with no significant instabilities. Also, the out put rate was higher than the industry standards by about 5 lbs/hr which is a fairly significant difference on in this particular extrusion process.

Part Two:

Several more sample lots of the inventive resin were made according to the procedure in part one. These sample lots and an industry standard sample were then made into film on the same extrusion line. They were processed under different conditions in order to find the range of film properties each sample possessed. The results are presented below in table two.

TABLE 2

| | Inventive Samples Several Lots | Industry Standard Sample |
| --- | --- | --- |
| Total Energy Dart Drop | | |
| ASTMD-4272 | 0.8–1.8 | 1.3–2.9 |
| Elemendorf Tear (g) | | |
| ASTMD-1922   MD | 18–29 | 17–28 |
| TD | 90–250 | 95–400 |
| Tensile at Yield (psi) | | |
| ASTMD-882   MD | 4450 | 4450 |
| TD | 4250 | 4100 |
| Elastic Mod. (psi) | | |
| ASTMD-882   MD | 131 | 136 |
| TD | 164 | 168 |

As can be seen from the above results the properties of the monomodal inventive resins are competitive with the multicomponent industry standard resin.

That which is claimed is:

1. A chromium catalyst composition comprising at least two chromium catalyst systems wherein:
   (a) at least one of said chromium catalyst systems comprises chromium and a support, and wherein the amount of said chromium is from about 0.5 to about 1 weight percent based on the total weight of said catalyst system, and wherein said support comprises silica and titania, and wherein said support has a pore volume from about 2 to about 3 cubic centimeters per gram, and wherein said support has a surface area from about 400 to about 600 square meters per gram; and (b) at least one of said chromium catalyst systems comprises chromium and a support, and wherein the amount of said chromium is from about 1 to about 1.5 weight percent based on the total weight of said catalyst system, and wherein said support comprises silica and titania, and wherein said support has a pore volume from about 0.7 to 1.4 cubic centimeters per gram, and wherein said support has a surface area from about 300 to about 400 square meters per gram.

2. A composition according to claim 1 wherein said supports in (a) and (b) consist essentially of silica and titania.

3. A composition according to claim 1 wherein said supports in (a) and (b) consist of silica and titania.

4. A composition according to claim 1 wherein said support in (b) has a pore volume from about 0.8 to about 1.2 cubic centimeters per gram.

5. A composition according to claim 4 wherein said supports in (a) and (b) consist essentially of silica and titania.

6. A composition according to claim 4 wherein said supports in (a) and (b) consist of silica and titania.

7. A chromium catalyst composition consisting essentially of two chromium catalyst systems wherein:

(a) one of said chromium catalyst systems consists essentially of chromium and a support, and wherein the amount of said chromium is from about 0.5 to about 1 weight percent based on the total weight of said catalyst system, and wherein said support consists essentially of silica and titania, and wherein said support has a pore volume from about 2 to about 3 cubic centimeters per gram, and wherein said support has a surface area from about 400 to about 600 square meters per gram; and (b) one of said chromium catalyst systems consists essentially of chromium and a support, and wherein the amount of said chromium is from about 1 to about 1.5 weight percent based on the total weight of said catalyst system, and wherein said support consists essentially of silica and titania, and wherein said support has a pore volume from about 0.7 to 1.4 cubic centimeters per gram, and wherein said support has a surface area from about 300 to about 400 square meters per gram.

8. A composition according to claim 7 wherein said supports in (a) and (b) consist of silica and titania.

9. A composition according to claim 7 wherein the support in (b) has a pore volume from about 0.8 to about 1.2 cubic centimeters per gram.

10. A composition according to claim 9 wherein said supports in (a) and (b) consist of silica and titania.

* * * * *